P. C. DAY.
TRANSMISSION GEARING.
APPLICATION FILED DEC. 26, 1913.
1,151,762.
Patented Aug. 31, 1915.
3 SHEETS—SHEET 1.
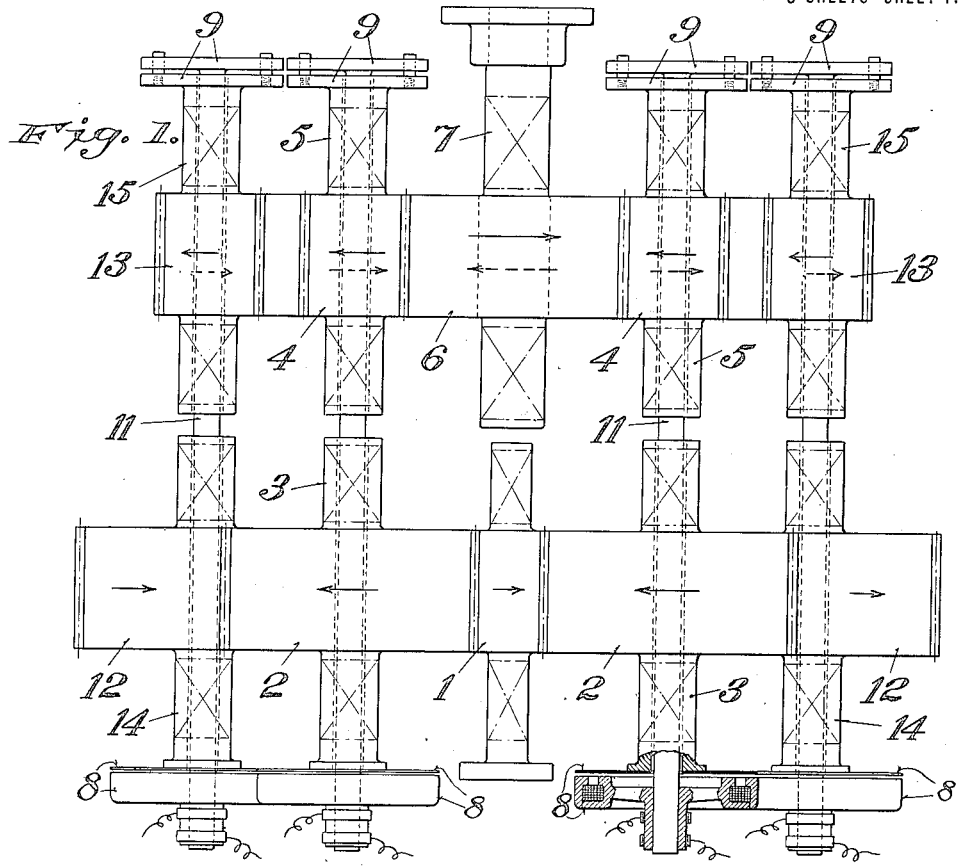
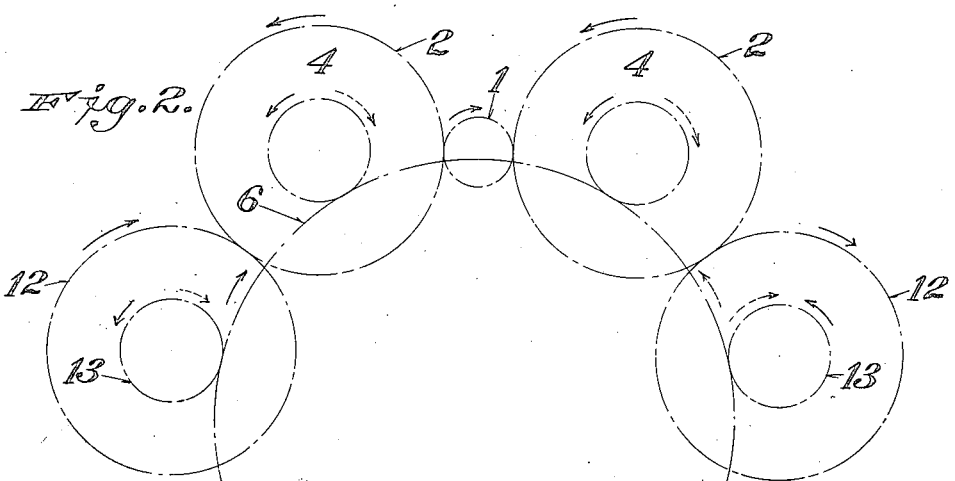
Witnesses:
Chas. L. Goss.
Ford Palm.
Inventor
Percy C. Day
By Handers Bottum Fawsett Bottum
Attorneys.

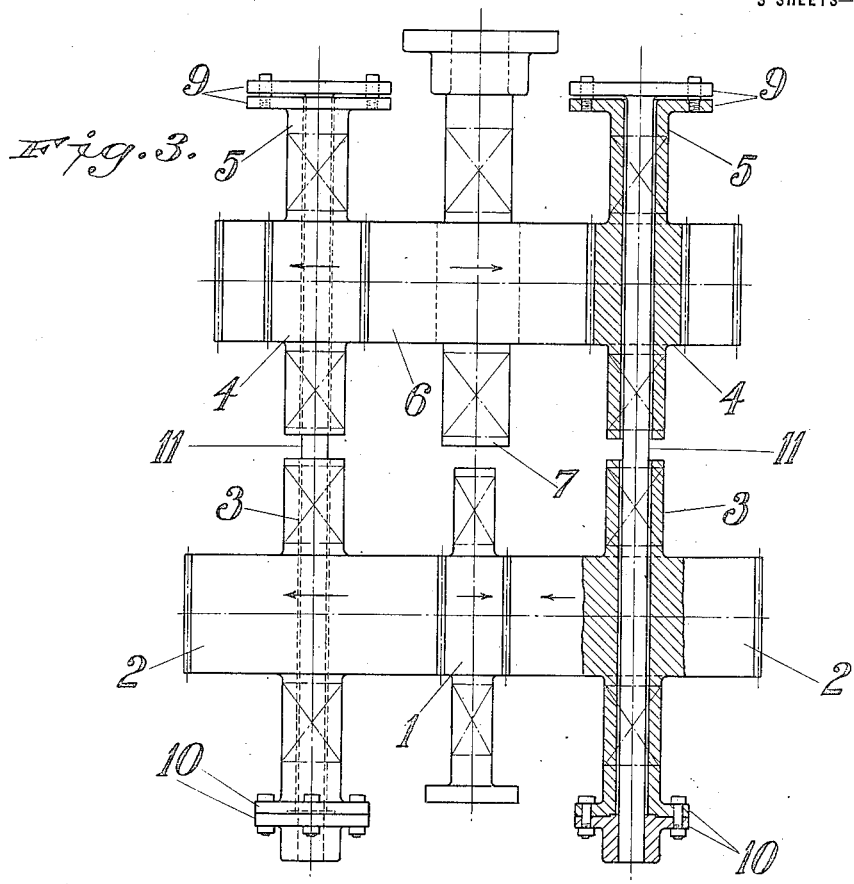
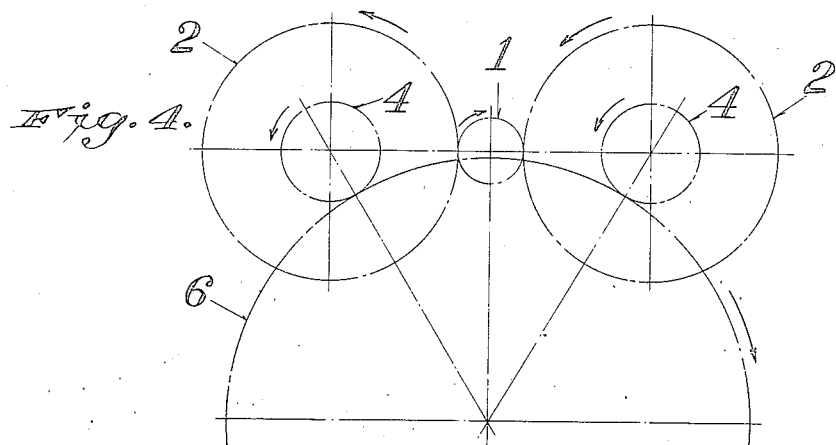

P. C. DAY.
TRANSMISSION GEARING.
APPLICATION FILED DEC. 26, 1913.
1,151,762.
Patented Aug. 31, 1915.
3 SHEETS—SHEET 3.
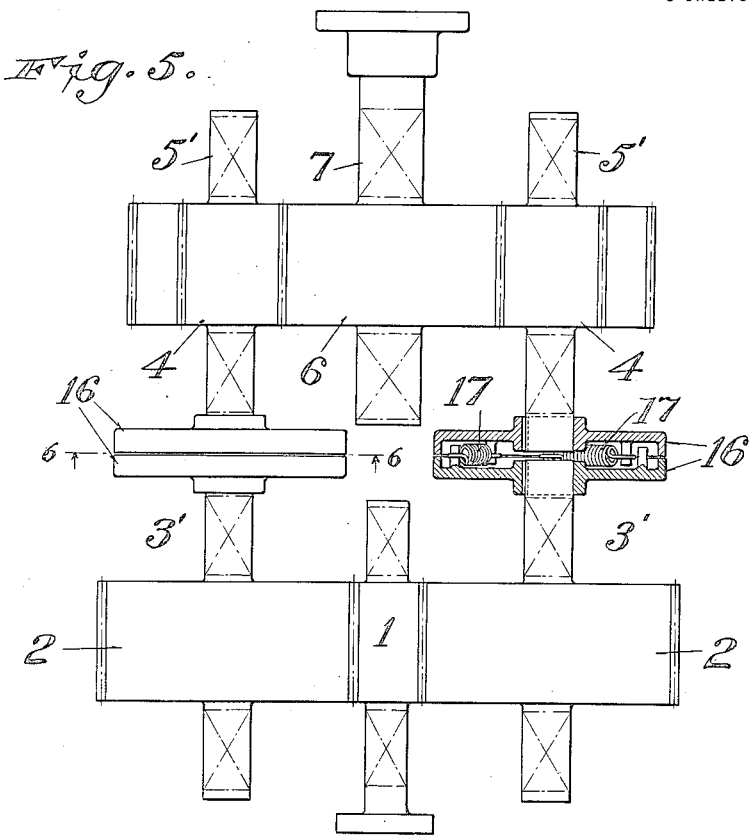
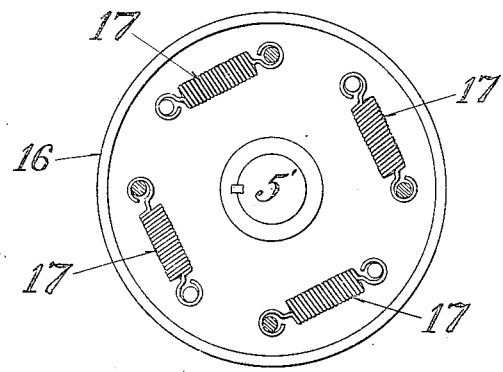
Witnesses:
Chas. L. Goss.
Fred Palm
Inventor:
Percy C. Day,
By Flanders Bottum Fawsett & Bottum
Attorneys.

UNITED STATES PATENT OFFICE.

PERCY C. DAY, OF MILWAUKEE, WISCONSIN, ASSIGNOR TO THE FALK COMPANY, OF WAUWATOSA, WISCONSIN, A CORPORATION OF WISCONSIN.

TRANSMISSION-GEARING.

1,151,762.

Specification of Letters Patent. Patented Aug. 31, 1915.

Application filed December 26, 1913. Serial No. 808,654.

*To all whom it may concern:*

Be it known that I, PERCY C. DAY, a subject of the Kingdom of Great Britain, residing at Milwaukee, in the county of Milwaukee and State of Wisconsin, have invented certain new and useful Improvements in Transmission-Gearing, of which the following is a specification, reference being had to the accompanying drawing forming a part thereof.

This invention relates more particularly to a special arrangement of double reduction or speed-change gearing which is adaptable for any required purpose, but is particularly suited for connecting high speed steam turbines to the propeller shafts of ships, and to slow speed machinery such as rolling mills or similar apparatus. The arrangement is particularly adapted for use with helical cut gearing, but the principles involved may be applied to any kind of spur gearing.

The main objects of the invention are to distribute the load between different zones or areas of engagement of the driving and driven gears with intermediate gears, so as to largely avoid deflection of the axis of the driving gear and reduce the requisite width of its face and the torsional displacement of one end of the gear relative to the other in the transmission of a given load and so as to reduce the size and weight of the driven gear under given conditions of speed and load; to effect a great reduction or change in speed in the transmission of heavy loads in a compact and efficient manner; to provide means for the quick and easy reversal of rotation of the driven gear while the driving gear is rotated constantly in one direction; and generally to improve the construction and operation of gearing of this class.

The invention consists in the construction, arrangement and combination of parts as hereinafter particularly described and pointed out in the claims.

In the accompanying drawing like characters designate the same parts in the several figures.

Figure 1 is a plan view of double reduction and reversing gearing embodying the invention; Fig. 2 is a diagrammatic end view of the gearing; Fig. 3 is a plan view of a similar arrangement without reversing gears; Fig. 4 is a diagrammatic end view of the gearing shown in Fig. 3; Fig. 5 is a plan view of a modification of the gearing without reversing gears; and Fig. 6 is an enlarged sectional view on the line 6—6, Fig. 5, of one of the resilient couplings.

Referring to Figs. 1 and 2, the gearing comprises a main driving pinion or gear 1, which meshes with and transmits power to two intermediate gears 2. The gears 2 are mounted on tubular or hollow shafts 3, which are supported in suitable bearings, as indicated by cross lines in Fig. 1. Two smaller intermediate gears or pinions 4, mounted on hollow or tubular shafts 5, which are supported in suitable bearings in axial alinement with the shafts 3, mesh with a main driven gear 6 of larger size than the gear 1 and fixed on a shaft 7, which, like the shaft of the driving gear or pinion 1, is supported in suitable bearings also indicated by cross lines in Fig. 1.

Mechanical connection between the hollow or tubular shafts 3 and 5 is made by means of resilient torsion couplings consisting, in one of their various forms of embodiment, as shown in Fig. 1, of resilient torsion shafts 11, passing through said tubular shafts and connected at their ends with the outer ends of said shafts by clutches 8 and couplings 9 of the freely extensible or axial slip type. The couplings 9 may consist as shown in Figs. 1 and 3, of flanges formed on or rigidly attached to adjacent ends of the connected shafts and separated from each other by an intervening space, one of each pair of flanges being provided with pins or studs freely fitting and movable lengthwise in holes in the other flange parallel with the axis of the alined shafts connected by the coupling. The larger intermediate gears 2 are thus connected with the smaller intermediate gears or pinions 4 in axially alined pairs. The clutches 8, which serve as couplings to connect the torsion shafts 11 at one end with the shafts 3, may be of any suitable construction and operated by electro-magnets, as indicated in Fig. 1, or by other means, such as levers or fluid pressure, to connect and disconnect the gears 2 and 4 at will.

When the driving gear or pinion 1 is rotated constantly in one direction, provison is made for reversing the rotation of the driven gear 6 by the addition of two sets of intermediate transmission gears 12 and 13, like or similar to the gears 2 and 4, and mounted in like manner on tubular or hollow shafts 14 and 15, parallel with the shafts 3 and 5, and with the shafts of the driving and driven gears 1 and 6. The gears 12 mesh with and are constantly driven by the gears 2, and the gears 13 mesh, like the gears 4, with the main driven gear 6. The reversing gears 12 and 13, like the gears 2 and 4, which may be called direct-drive gears, are arranged in axially alined pairs, and the gears 12 and 13 of each pair are in like manner connected by a resilient torsion shaft 11, clutch 8 and extensible or axial slip coupling 9, or by other suitable resilient torsion and detachable coupling means.

The shafts 11 are made of such diameter that while they will transmit the power safely, the transmission will be accompanied by appreciable torsional displacement between their extreme ends, or their connections with the tubular shafts of the intermediate gears 2, 4, 12 and 13.

The axial locations of the driving gear or pinion 1 and the driven gear 6, are determined by their shafts or the connections therewith. When herringbone or helical gears are used, the extensible or axial slip couplings 9 permit the gears 2 and the gears 12 to adjust themselves axially, so that the gears 2 will properly mesh with the driving gear or pinion 1, and the gears 12 will properly mesh with the gears 2. In like manner the gears 4 and 13 are permitted to adjust themselves so as to mesh properly with the driven gear 6.

Approximate equality in the division of the load between the two gears 2 and the two gears 4, and between the two reversing gears 12 and the two gears 13, is obtained through the torsional resilience of the shafts 11, which transmit power from one set of gears to the other.

The clutches 8 may be connected so as to be thrown in and out in pairs simultaneously or otherwise, in order to connect the gears 4 with the gears 2 of the direct-drive train, or the gears 13 with the gears 12 of the reversing train, and thereby reverse the direction of rotation of the driven gear 6, as indicated by full and dotted line arrows on Fig. 1, without reversing the driving gear 1.

The driving gear 1 being rotated constantly in one direction, the intermeshing gears 2 and 12 will always be rotated in opposite directions, as indicated thereon by full line arrows, but the gears 4 and 13 all meshing with the gear 6, will be simultaneously rotated in the same direction, as indicated thereon by full and dotted line arrows, the full line arrows indicating the direction of rotation of the gears 4, 6 and 13 when the gears 2 and 4 of the direct drive train are operatively connected, and the dotted line arrows indicating the direction of rotation of said gears 4, 6 and 13 when the gears 12 and 13 of the reversing train are operatively connected.

When the driven gear 6 is to be turned in one direction only, or always in the same direction as the driving gear 1, the reversing gears 12 and 13 may be omitted and the torsion shafts 11 of the direct-drive intermediate gears 2 and 4 may be permanently connected at one end with the tubular shafts 3 of the gears 2 by flange couplings 10 or other suitable means, as shown in Fig. 3.

The shafts 3, 5, 14 and 15 may be connected at their inner ends by the torsion shafts 11 and couplings like or similar to the couplings 10 or 9, or clutches 8, or each shaft 11 may pass through the tubular shaft of but one of a pair of intermediate gears and be connected with the other gear or its shaft in any suitable manner, or the shafts of the intermediate gears may be made solid and connected at their inner ends, as shown in Figs. 5 and 6, by other forms of resilient torsion couplings such as the couplings 16, each consisting of two members mounted on the inner ends of the shafts 3' and 5' and connected with each other by springs 17.

It is to be understood that either of the main gears 1 or 6 may be the driving gear, according as the speed is to be reduced or increased by the transmission gearing, and with the reversing arrangement of the gearing shown in Fig. 1, resilient torsion couplings of the type shown in Figs. 5 and 6 may be used in place of the torsion shafts 11.

Various changes other than those hereinbefore specifically mentioned, in the construction and arrangement of parts may be made without departing from the principle and scope of the invention as defined in the following claims.

I claim:

1. In transmission gearing the combination of a driving gear, a driven gear, two sets of axially alined intermediate gears meshing respectively with the driving and driven gears, and resilient torsion couplings connecting one gear of each set with the corresponding gear of the other set of intermediate gears.

2. In transmission gearing the combination of a driving gear, a driven gear of different size, two sets of intermediate gears of different size meshing respectively with the driving and driven gears and arranged in axially alined pairs, and resilient torsion couplings connecting one gear of each pair with the other.

3. In transmission gearing the combination of a driving gear, a driven gear, two sets of intermediate gears meshing respectively with the driving and driven gears and arranged in axially alined pairs, and resilient torsion shafts each connecting a pair of intermediate gears.

4. In transmission gearing the combination of a driving gear, a driven gear, two sets of intermediate gears meshing respectively with the driving and driven gears and arranged in axially alined pairs, resilient torsion shafts connecting the several pairs of intermediate gears, and axial slip-couplings connecting each of said shafts with one gear of a pair.

5. In transmission gearing the combination of a driving gear, a driven gear, two sets of intermediate gears meshing respectively with the driving and driven gears and arranged in axially alined pairs, one gear of each pair having a hollow shaft, and resilient torsion shafts each passing through and connected at one end with the hollow shaft of one of a pair of intermediate gears and connected at the opposite end with the other gear of the same pair.

6. In transmission gearing the combination of a driving gear, a driven gear, two sets of intermediate gears meshing respectively with the driving and driven gears and having hollow shafts, the intermediate gears being arranged in axially alined pairs, and resilient torsion shafts each passing through and connected at its ends with the outer ends of the hollow shafts of a pair of intermediate gears.

7. In transmission gearing the combination of main driving and driven gears, two sets of intermediate direct drive gears meshing respectively with the main driving and driven gears and arranged in axially alined pairs, two sets of intermediate reversing gears meshing respectively with one of the main gears and with the intermediate gears which mesh with the other main gear and arranged in axially alined pairs, resilient torsion couplings connecting each pair of intermediate gears, and clutches for connecting and disconnecting the several pairs of intermediate gears.

8. In transmission gearing the combination of main driving and driven gears, two sets of intermediate direct drive gears meshing respectively with the main driving and driven gears and arranged in axially alined pairs, two sets of intermediate reversing gears meshing respectively with one of the main gears and with the intermediate gears which mesh with the other main gear and arranged in axially alined pairs, resilient torsion shafts each connected at one end with one gear of a pair, and a clutch for connecting and disconnecting the opposite end of each torsion shaft with the other gear of the same pair of intermediate gears.

In witness whereof I hereto affix my signature in presence of two witnesses.

PERCY C. DAY.

Witnesses:
   CHAS. L. GOSS,
   FRED PALM.